(12) United States Patent
Yamamoto et al.

(10) Patent No.: US 7,326,666 B2
(45) Date of Patent: Feb. 5, 2008

(54) GLASS FOR FORMING BARRIER RIBS, AND PLASMA DISPLAY PANEL

(75) Inventors: Hiroyuki Yamamoto, Fukushima (JP); Satoshi Fujimine, Yokohama (JP); Hitoshi Onoda, Yokohama (JP); Hiroshi Usui, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 529 days.

(21) Appl. No.: 10/981,613

(22) Filed: Nov. 5, 2004

(65) Prior Publication Data

US 2005/0113241 A1  May 26, 2005

(30) Foreign Application Priority Data

Nov. 6, 2003 (JP) ............... 2003-377136
Dec. 25, 2003 (JP) ............... 2003-429681

(51) Int. Cl.
*C03C 3/066* (2006.01)
*C03C 3/093* (2006.01)

(52) U.S. Cl. ............... 501/67; 501/79; 313/582

(58) Field of Classification Search ............... 50/15, 50/26, 67, 79; 313/582–587; 501/15, 26, 501/67, 79
See application file for complete search history.

(56) References Cited

U.S. PATENT DOCUMENTS 5,714,840 A   2/1998  Tanabe et al.

6,271,161 B1 *  8/2001  Ryu et al. ............... 501/76
2007/0032364 A1 *  2/2007  Onoda et al. ............... 501/15

FOREIGN PATENT DOCUMENTS

| JP | 11-73874 | | 3/1999 |
|---|---|---|---|
| JP | 11092168 | * | 4/1999 |
| JP | 11-228178 | | 8/1999 |
| JP | 2000-128574 | | 5/2000 |
| JP | 2000-226231 | | 8/2000 |
| JP | 2001-58844 | | 3/2001 |
| JP | 2001-130926 | | 5/2001 |
| JP | 2001-163635 | | 6/2001 |
| JP | 2003-128430 | | 5/2003 |
| JP | 2004-277212 | | 10/2004 |

* cited by examiner

*Primary Examiner*—Karl E Group
(74) *Attorney, Agent, or Firm*—Oblon, Spivak, McClelland, Maier & Neustadt, P.C.

(57) ABSTRACT

Glass for forming barrier ribs for e.g. a plasma display panel, which consists, as represented by mol % based on the following oxides, essentially of from 24 to 50% of $SiO_2$, from 13 to 23% of $B_2O_3$, from 10 to 32% of ZnO, from 3 to 20% of $Li_2O$, from 1 to 9% of $Na_2O$, from 1 to 15% of $Al_2O_3$, from 0 to 20% of MgO+CaO+SrO+BaO, and from 0 to 9% of $Bi_2O_3$, wherein $((B_2O_3+ZnO)-Al_2O_3)$ is at least 24 mol %; in a case where $ZrO_2$ is contained, its content is at most 2 mol %; and neither PbO nor F is contained.

19 Claims, No Drawings

GLASS FOR FORMING BARRIER RIBS, AND PLASMA DISPLAY PANEL

BACKGROUND OF THE INVENTION

1. Field of the Invention

The present invention relates to glass to be used for forming barrier ribs for e.g. a plasma display panel (PDP) by firing, and PDP.

2. Discussion of Background

In recent years, attention has been drawn to PDP as a large size thin flat plate color display device. PDP has a structure wherein many cells (fine discharge spaces) are formed as partitioned by barrier ribs between a pair of glass substrates, phosphors are provided on the surface of the respective cells, and a discharge gas is filled in such cells. Discharge takes place between electrodes in the cells to excite the discharge gas to let the phosphors in the ground state emit lights by ultraviolet rays thereby generated, to form pixels. Such PDP is a self emitting type flat display and has excellent characteristics such as wide horizontal and vertical view-angle and being thin and light in weight, and further, it can be made to have a large size. Thus, it is one of the most prospective display devices.

The materials for forming such barrier ribs are desired to be one which can be fired at a low temperature such as at most 615° C., preferably at most 600° C., to prevent deformation of the glass substrates. Heretofore, as such a material, glass containing a large amount of lead oxide (PbO) or bismuth oxide ($Bi_2O_3$) as a component to lower the softening point, has been used.

In recent years, glass for forming barrier ribs which contains neither PbO nor $Bi_2O_3$ or which contains no PbO and does not contain $Bi_2O_3$ in a large amount, is desired, and a ZnO—$B_2O_3$—$SiO_2$ type glass (e.g. Patent document 1) or a ZnO—$B_2O_3$—BaO type glass (e.g. Patent document 2) has, for example, been proposed.

Patent document 1: JP-A-2001-130926
Patent document 2: JP-A-11-228178

SUMMARY OF THE INVENTION

Each of glasses proposed in Patent documents 1 and 2, contains F and is thus likely to bring about a problem of vaporization of F at the time of melting the glass. It is an object of the present invention to provide glass for forming barrier ribs, which contains no F and which is capable of solving the above-mentioned problem.

The present invention provides glass for forming barrier ribs (first glass of the present invention), which consists, as represented by mol % based on the following oxides, essentially of from 24 to 50% of $SiO_2$, from 13 to 23% of $B_2O_3$, from 10 to 32% of ZnO, from 3 to 20% of $Li_2O$, from 1 to 9% of $Na_2O$, from 1 to 15% of $Al_2O_3$, from 0 to 20% of MgO+CaO+SrO+BaO, and from 0 to 9% of $Bi_2O_3$, wherein (($B_2O_3$+ZnO)—$Al_2O_3$) is at least 24 mol %; in a case where $ZrO_2$ is contained, its content is at most 2 mol %; and neither PbO nor F is contained.

Further, the present invention provides glass for forming barrier ribs (second glass of the present invention), which consists, as represented by mol % based on the following oxides, essentially of from 24 to 50% of $SiO_2$, from 13 to 32% of $B_2O_3$, from 15 to 32% of ZnO, from 3 to 20% of $Li_2O$, from 1 to 15% of $Na_2O$, from 1 to 15% of $Al_2O_3$, from 0 to 20% of MgO+CaO+SrO+BaO, and from 0 to 9% of $Bi_2O_3$, wherein (($B_2O_3$+ZnO)—$Al_2O_3$) is at least 24 mol %; ($Na_2O$—$Li_2O$) is at most 4 mol %; in a case where $ZrO_2$ is contained, its content is at most 2 mol %; and neither PbO nor F is contained.

Further, the present invention provides glass for forming barrier ribs (third glass of the present invention), which consists, as represented by mol % based on the following oxides, essentially of from 21 to 50% of $SiO_2$, from 12 to 35% of $B_2O_3$, from 15 to 37% of ZnO, from 1 to 25% of $Li_2O$, from 0 to 21% of $Na_2O$, from 1 to 25% of $Al_2O_3$, from 0 to 20% of MgO+CaO+SrO+BaO, and from 0 to 9% of $Bi_2O_3$, wherein ($B_2O_3$+ZnO) is at most 50 mol %; (($B_2O_3$+ZnO)—$Al_2O_3$) is at least 24 mol %; in a case where $K_2O$ is contained, its content is at most 5 mol %; and neither PbO nor F is contained.

Still further, the present invention provides a plasma display panel having barrier ribs formed by using such glass for forming barrier ribs.

It is possible to form dense barrier ribs for e.g. PDP, by the material wherein neither PbO nor F is contained and even when $Bi_2O_3$ is contained, its content is small at a level of at most 9 mol %.

Further, in one embodiment of the present invention, it is possible to suppress generation of $H_2O$ gas during the production or use of PDP, and it becomes possible to increase the initial luminance of PDP or to prolong the useful life of PDP.

Further, in a preferred embodiment of the present invention, it is possible to obtain barrier ribs having a cross-sectional shape such that the upper end portions of trapezoid are rounded.

The glass for forming barrier ribs of the present invention (hereinafter referred to simply as the glass of the present invention) is usually pulverized, classified and used in the form of a glass powder. Such a glass powder is usually mixed with e.g. a ceramic filler or a heat resistant pigment, as the case requires and further kneaded with a vehicle having a resin dissolved in an organic solvent, thereby to form a glass paste. This glass paste is applied to a substrate, then formed into non-fired barrier ribs of a prescribed pattern and then fired to form barrier ribs. Here, the resin may, for example, be ethyl cellulose, polyacrylate, polyvinyl butyral or nitrocellulose, and the organic solvent may, for example, be α-terpineol, butylcarbitol acetate or isopentyl acetate.

The glass of the present invention will be used for forming barrier ribs of e.g. PDP or VFD (vacuum fluorescent display).

In a case where the glass of the present invention will be employed for forming barrier ribs of PDP, the above-mentioned substrate will be a glass substrate, and usually, address electrodes will be formed thereon, and on such address electrodes, a dielectric layer will be formed as an insulating coating layer to prevent erroneous discharge.

The maximum temperature for the firing applied to the above-mentioned non-fired barrier ribs, is usually from 500 to 600° C. If it is lower than 500° C., it is likely that the resin in the vehicle will remain in the barrier ribs after the firing, and such a residual resin will be gasified when a panel will be sealed during the production of PDP or when panel discharge will take place. If it exceeds 600° C., the glass substrate may undergo deformation.

PDP having barrier ribs thus formed, is PDP of the present invention.

The softening point Ts of the glass of the present invention is preferably at most 615° C. If it exceeds 615° C., the fluidity of the glass at the time of the firing, tends to be low, whereby dense barrier ribs may no be obtained. It is more preferably at most 600° C., further preferably at most 590° C.

The average linear expansion coefficient α of the glass of the present invention within a range of from 50 to 350° C., is preferably from $65\times10^{-7}$ to $95\times10^{-7}/°$ C. If it is outside this range, it tends to be difficult to bring the average linear expansion coefficient of barrier ribs (fired body) to be obtained by firing a mixture of such a powder with e.g. a ceramic filler, to the desired range i.e. from $65\times10^{-7}$ to $85\times10^{-7}/°$ C. The average linear expansion coefficient α is more preferably from $65\times10^{-7}$ to $90\times10^{-7}/°$ C., particularly preferably from $70\times10^{-7}$ to $80\times10^{-7}/°$ C. Further, the average linear expansion coefficient of a glass substrate is typically from $80\times10^{-7}$ to $90\times10^{-7}/°$ C.

The relative dielectric constant $\in$ at 20° C. at 1 MHz of the glass of the present invention is preferably at most 11. If it exceeds 11, the power consumption of PDP tends to be large. It is more preferably at most 10.

The "index w for $H_2O$ gas generation during firing" measured as described below with respect to the glass of the present invention, is preferably at most $4\times10^{-10}$ A. If it exceeds $4\times10^{-10}$ A, generation of $H_2O$ gas during the production or use of PDP tends to be large, and the brightness, etc. of PDP tend to be insufficient. It is more preferably at most $3.5\times10^{-10}$ A, particularly preferably at most $3\times10^{-10}$ A, most preferably at most $2.5\times10^{-10}$ A.

Method for Measuring w

The glass is pulverized to a powder having a mass average particle diameter of from 1.5 to 3.0 μm.

30 g of this powder, 4 g of a silica filler (typically pulverized one) and 16 g of a vehicle obtained by dissolving 9.6 g of ethylcellulose (e.g. STD100, manufactured by Dow Chemical) and 2.4 g of an acrylic resin (e.g. BR101, manufactured by Mitsubishi Rayon Co., Ltd.) in 88 g of α-terpineol (e.g. Terpineol C, manufactured by Nippon Terpene Chemicals, Inc.) at 80° C. for 2 hours, are stirred in a mortar and then kneaded by means of a three roll mill, to obtain a glass paste.

Then, a glass substrate (e.g. PD200, manufactured by Asahi Glass Company, Limited) is prepared, and on this glass substrate, the above-mentioned glass paste is applied by blade coating by means of a spacer having a thickness of 400 μm, then held at 120° C. for 90 minutes for drying and then held at 560° C. for 30 minutes for firing to obtain a fired product-coated glass substrate.

This fired product-coated glass substrate is heated under a high vacuum of $1\times10^{-7}$ Pa to 800° C. at a rate of 60° C./min, whereby the amount of $H_2O$ gas generated during the temperature raising step is measured as an ionized $H_2O$ current by means of a quadrupole type mass spectrometer (e.g. QMG 421C, manufactured by BALZERS). A graph is prepared by plotting the temperature along the abscissa and the above current I per 100 mg of the glass along the ordinate, whereupon the minimum value $I_{min}$ of I within a temperature range of from 300 to 750° C. and the maximum value $I_{max}$ of I within a range of from the temperature where I is $I_{min}$ to 750° C., are read out, and $I_{max}-I_{min}$ is calculated and taken as w.

The cross-sectional shape of the barrier ribs formed by using the glass powder of the present invention is generally a trapezoid. Such a cross-sectional shape is preferably a trapezoid or one having end portions of the upper hem (upper end portions) of the trapezoid rounded. On the other hand, one which is generally a trapezoid but wherein the upper hem is higher at both ends than the center, and the upper hem is at a sharp angle to the sides, is not desirable.

The cross-sectional shape of the barrier ribs will be observed as follows.

Method for Observing the Cross-Sectional Shape of Barrier Ribs

The same glass paste as used for the measurement of w, is prepared.

Then, a glass substrate having a size of 100 mm×100 mm (e.g. PD200, manufactured by Asahi Glass Company, Limited) is prepared, and on this glass plate, the above-mentioned glass paste is applied by blade coating by means of a spacer having a thickness of 400 μm and then held at 120° C. for 90 minutes for drying to obtain a dried film-coated glass substrate.

A dry film (e.g. DRY FILM BF704, manufactured by Tokyo Ohka Kogyo Co., Ltd.) is cut into a size of 4 cm×5 cm, and the above-mentioned dried film-coated glass substrate is passed once through a laminator under such conditions that the roll temperature is 110° C., the roll pressure is 150 kPa, and the substrate-transporting speed is 0.45 m/min.

Then, an exposure mask having a stripe pattern with a line width of 110 μm, is set, followed by exposure with 250 mJ/cm², then by development with a developer of a 0.3% sodium carbonate aqueous solution and then by drying for 15 minutes by a dryer of 50° C. The dried product is subjected to sand blasting by means of a sand blasting apparatus (model: ELP-1TR) manufactured by Elfo-tec under such conditions that the abrasive-supplying air pressure is 140 kPa, the pressure transporting air pressure is 160 kPa, and a roller rotational speed is 35 rpm, and then peeled with a 1% NaOH solution and dried for 30 minutes by a dryer of 80° C.

It is then put into an electric furnace and held at 560° C. for 30 minutes for firing to obtain a glass substrate having barrier ribs formed, whereupon the cross section of the barrier ribs is observed by a scanning electron microscope.

The first and second glasses of the present invention represent preferred embodiments when it is desired to increase the sinterability, etc.

Now, the composition of the first glass of the present invention will be described, wherein mol % will be represented simply by %.

$SiO_2$ is a network former and is essential. If it is less than 24%, Ts tends to be too low, and when such glass is fired, it tends to be difficult to maintain the shape as barrier ribs, or a tends to be too large. It is preferably at least 25%, more preferably at least 27%, particularly preferably at least 30%. If it exceeds 50%, Ts tends to be too high. It is preferably at most 47%, typically at most 45%.

$B_2O_3$ is a component to stabilize the glass and to increase the sinterability and is essential. If it is less than 13%, the sinterability tends to decrease, and it tends to be difficult to obtain dense barrier ribs. It is preferably at least 14%. If it exceeds 23%, the alkali resistance or the water resistance tends to decrease, or the above-mentioned w tends to be large. It is preferably at most 21%.

ZnO is a component to increase the sinterability and is essential. If it is less than 10%, the sinterability tends to be low, and it tends to be difficult to obtain dense barrier ribs. It is preferably at least 14%. If it exceeds 32%, the alkali resistance or the water resistance tends to be low, or devitrification tends to take place, or the sinterability may rather deteriorate. It is typically at most 27%, more typically at most 22%.

The total amount of $B_2O_3$ and ZnO is preferably at most 50%. If it exceeds 50%, w is likely to be large. It is more preferably at most 45%.

$Li_2O$ is a component to lower Ts and to increase the sinterability and is essential. If it is less than 3%, the sinterability tends to be low. It is preferably at least 5%, more preferably at least 6%. If it exceeds 20%, α is likely to be too large. It is preferably at most 16%, more preferably at most 14%.

$Na_2O$ is a component to lower Ts and to increase the sinterability, and is essential. If it is less than 1%, the sinterability tends to be low. It is preferably at least 2%. If it exceeds 9%, α is likely to be too large, or the sinterability tends to be low. It is preferably at most 8%.

In a case where it is desired to further increase the sinterability, it is preferred that ($Na_2O$—$Li_2O$) is at most 4%, i.e. the $Li_2O$ content is at least the $Na_2O$ content, or the $Na_2O$ content is larger than the $Li_2O$ content and the difference between them is at most 4%.

$Al_2O_3$ is effective for stabilizing the glass, for increasing the chemical durability or for lowering the above-mentioned α, and is essential. If it is less than 1%, the above-mentioned effects tend to be small. It is preferably at least 2%. If it exceeds 15%, Ts tends to be high, and the sinterability tends to be low, or the glass tends to be unstable. It is preferably at most 13%. In a case where it is desired to bring the cross-sectional shape of the barrier ribs to be such that the upper end portions of the trapezoid are rounded, $Al_2O_3$ is preferably more than 5%, more preferably at least 7%.

The total of the contents of $SiO_2$ and $Al_2O_3$ i.e. $SiO_2+Al_2O_3$ is preferably at most 55%. If it exceeds 55%, Ts tends to be high, or the glass tends to be unstable. It is more preferably at most 51%. Further, $SiO_2+Al_2O_3$ is preferably at least 30%, more preferably at least 33%.

In order to stabilize the glass or in order to increase the sinterability, (($B_2O_3+ZnO$)—$Al_2O_3$) is made to be at least 24%.

(ZnO—$Al_2O_3$) is preferably at least 4%. If it is less than 4%, phase separation tends to occur. It is more preferably at least 5%.

MgO, CaO, SrO and BaO are not essential, but may be incorporated in a total amount of up to 20% in order to lower Ts, to suppress devitrification, to adjust α or to suppress precipitation of crystals during the firing. If the total amount exceeds 20%, the sinterability tends to be low. It is preferably at most 16%. In a case where no $Bi_2O_3$ is contained, etc., the above-mentioned total amount is preferably at most 10%.

In a case where ZnO is less than 15% and MgO is contained, the content of MgO is preferably at most 2%, more preferably at most 1%. If it exceeds 2%, the glass tends to undergo phase separation. If ZnO is less than 15%, it is particularly preferred that no MgO is contained.

In a case where no $Bi_2O_3$ is contained, etc., when MgO, CaO, SrO or BaO is contained, the content of each component thus contained is preferably at most 8%.

$Bi_2O_3$ is not essential, but may be incorporated up to 9% in order to e.g. increase the sinterability. If it exceeds 9%, Ts or the above-mentioned ε tends to be high. When $Bi_2O_3$ is contained, its content is preferably at least 0.1%.

When it is desired to further lower Ts, ($Li_2O+Na_2O+Bi_2O_3$) is preferably at least 11%. Namely, when $Bi_2O_3$ is contained, the total content of $Li_2O$, $Na_2O$ and $Bi_2O_3$ is preferably at least 11%, and when no $Bi_2O_3$ is contained, the total amount of $Li_2O$ and $Na_2O$ is preferably at least 11%.

The first glass of the present invention consists essentially of the above-described components. However, it may further contain other components within a range of not to impair the purpose of the present invention. When such other components are contained, the total of such contents is preferably at most 10%, more preferably at most 5%.

As such other components, $SnO_2$, $ZrO_2$, $TiO_2$, $CeO_2$, $K_2O$ and CuO may be mentioned as components to adjust Ts or α or to suppress devitrification. Further, a rare earth oxide such as $La_2O_3$ other than $CeO_2$, $P_2O_5$, MnO, $Fe_2O_3$, CoO, NiO, $GeO_2$, $Y_2O_3$, $MoO_3$, $Rh_2O_3$, $Ag_2O$, $In_2O_3$, $TeO_2$, $WO_3$, $ReO_2$, $V_2O_5$ and PdO may, for example, be mentioned.

In a case where among them, at least one of $SnO_2$, $CeO_2$ and CuO is contained, the total of such contents is preferably at most 2%. If it exceeds 2%, devitrification tends to take place, or Ts tends to be too high.

In a case where it is desired to suppress coloration of barrier ribs to be obtained by firing, $SnO_2$ may be contained within a range of at most 2%. If it exceeds 2%, Ts tends to be too high. It is preferably at most 0.9%.

In a case where it is desired to further improve the water resistance, at least one of $ZrO_2$ and $TiO_2$ may be incorporated in a total amount within a range of at most 7%. If it exceeds 7%, Ts tends to be too high.

Further, in a case where $ZrO_2$ is contained, its content must be at most 2%. If it exceeds 2%, the glass tends to be unstable.

In a case where $K_2O$ is contained, its content is preferably at most 5%. If it exceeds 5%, w tends to be large. Such a content is more preferably at most 3.5%, particularly preferably less than 1%.

The second glass of the present invention differs from the first glass of the present invention in that the upper limits of the contents of $B_2O_3$ and $Na_2O$ and the lower limit of the content of ZnO are different, and ($Na_2O$—$Li_2O$) is at most 4%. With respect to other points which are common to both glasses, the description will be omitted, since it is the same as the one made with respect to the first glass of the present invention. Now, only the above-mentioned different points will be described.

$B_2O_3$ is a component to stabilize the glass and to increase the sinterability and is essential. If it exceeds 32%, the alkali resistance or the water resistance tends to deteriorate, or the above-mentioned w tends to be large. It is preferably at most 23%, more preferably at most 21%.

ZnO is a component to increase the sinterability or the melting property and is essential. If it is less than 15%, the sinterability tends to be low, and it tends to be difficult to obtain dense barrier ribs, or the melting property tends to be low. Further, if ZnO is less than 15%, phase separation tends to occur in a case where MgO is incorporated in an amount exceeding 2% or exceeding 1%.

$Na_2O$ is a component to lower Ts and to increase the sinterability and is essential. If it exceeds 15%, α tends to be too large, or the sinterability tends to be low. It is preferably at most 13%, more preferably at most 9%, particularly preferably at most 8%.

If ($Na_2O$—$Li_2O$) exceeds 4%, the sinterability tends to be low. It is preferably at most 3%.

The third glass of the present invention is an embodiment suitable when it is desired to lower w.

The third glass of the present invention differs from the first glass of the present invention in the lower limit of the content of $SiO_2$, the upper and lower limits of the content of $B_2O_3$, the upper and lower limits of the content of ZnO, the upper and lower limits of the content of $Li_2O$, the upper and lower limits of the content of $Na_2O$ and the upper limit of the content of $Al_2O_3$ and in that ($B_2O_3+ZnO$) is at most 50%, that in a case where $K_2O$ is contained, its content is at most 5%, and that in a case where $ZrO_2$ is contained, the upper limit of its content is not expressly defined. With respect to other points common to both glasses, the description will be omitted, since it is the same as the one made with respect to the first glass of the present invention. Now, only the above-mentioned different points will be described.

$SiO_2$ is a network former and is essential. If it is less than 21%, Ts tends to be too low, and when sintered, it tends to be difficult to maintain the shape as barrier ribs, or α tends to be too large. It is preferably at least 24%, more preferably at least 27%, particularly preferably at least 30%.

$B_2O_3$ is a component to stabilize the glass and to increase the sinterability an is essential. If it is less than 12%, the sinterability tends to be low, and it tends to be difficult to obtain dense barrier ribs. It is preferably at least 13%. If it exceeds 35%, the alkali resistance or the water resistance tends to be low, or w tends to be large. It is preferably at most 32%, more preferably at most 29%.

ZnO is a component to increase the sinterability or the melting property and is essential. If it is less than 15%, the melting property tends to be low, or the sinterability tends to be low, and it tends to be difficult to obtain dense barrier ribs. If ZnO is less than 15%, phase separation tends to occur in a case where MgO is incorporated in an amount exceeding 2% or exceeding 1%. It is preferably at least 17%. If it exceeds 37%, the alkali resistance or the water resistance tends to be low, devitrification tends to take place, or the sinterability rather tends to be low. It is typically at most 32%.

The total amount of $B_2O_3$ and ZnO is at most 50%. If it exceeds 50%, w tends to be large. It is preferably at most 45%.

$Li_2O$ is a component to lower Ts and to increase the sinterability and is essential. If it is less than 1%, the sinterability tends to be low. It is preferably at least 3%. If it exceeds 25%, α tends to be too large. It is preferably at most 20%.

$Na_2O$ is not essential, but may be incorporated up to 21% e.g. in order to increase the sinterability or to lower Ts. If it exceeds 21%, a tends to be too large, or the sinterability tends to be low. It is preferably at most 15%. In a case where $Na_2O$ is contained, its content is preferably at least 1%.

$Al_2O_3$ is effective for stabilizing the glass, for increasing the chemical durability or for lowering the above-mentioned a and is essential. If it exceeds 25%, Ts tends to be high, and the sinterability tends to be low, or the glass tends to be unstable. It is preferably at most 15%.

In a case where the third glass of the present invention contains $K_2O$, its content is at most 5%. If it exceeds 5%, w tends to be large. The content is preferably at most 3.5%, more preferably less than 1%.

Further, the third glass of the present invention may contain $ZrO_2$, but in such a case, the content is preferably at most 2%. If it exceeds 2%, the glass tends to be unstable.

In a case where it is desired to lower Ts or ∈, it is preferred, for example, that the glass of the present invention consists essentially of from 30 to 50% of $SiO_2$, from 13 to 21% of $B_2O_3$, from 14 to 32% of ZnO, from 6 to 16% of $Li_2O$, from 2 to 8% of $Na_2O$, from 1 to 5% of $Al_2O_3$, and from 0 to 10% of MgO+CaO+SrO+BaO, and no $Bi_2O_3$ is contained.

In a case where it is desired to obtain barrier ribs having a cross-sectional shape such that the upper end portions of trapezoid are rounded, it is preferred, for example, that the glass of the present invention consists essentially of from 25 to 40% of $SiO_2$, from 14 to 32% of ZnO, from 11 to 22% of $Li_2O+Na_2O+Bi_2O_3$, from more than 5 to 15% of $Al_2O_3$, from 0 to 10% of MgO+CaO+SrO+BaO, and from 25 to 55% of $SiO_2+Al_2O_3$.

Or, one which consists essentially of from 25 to 40% of $SiO_2$, from 15 to 23% of $B_2O_3$, from 14 to 32% of ZnO, from 6 to 14% of $Li_2O$, from 3 to 13% of $Na_2O$, from 5 to 15% of $Al_2O_3$, from 0 to 10% of MgO+CaO+SrO+BaO, from 30 to 55% of $SiO_2+Al_2O_3$, from 11 to 22% of $Li_2O+Na_2O$, $(Na_2O—Li_2O)\leqq 4\%$, and $((B_2O_3+ZnO)—Al_2O_3)\geqq 24\%$ and which contains no $Bi_2O_3$, and wherein in a case where $SnO_2$ is contained, its content is at most 2%, may also be mentioned as a preferred embodiment.

In a case where it is desired to increase the electrical insulating property, it is preferred, for example, that the glass of the present invention consists essentially of from 24 to 45% of $SiO_2$, from 4 to 15% of $Li_2O+Na_2O$, from 0.1 to 9% of $Bi_2O_3$ and from 25 to 55% of $SiO_2+Al_2O_3$.

As mentioned above, the glass of the present invention is to be used for the production of a barrier ribs-formed substrate (the rear substrate) for PDP, etc. For example, on a glass substrate having address electrodes formed thereon and having a dielectric layer as an insulating layer formed thereon, a glass paste containing a powder of the glass of the present invention is applied, followed by forming non-fired barrier ribs of a prescribed pattern by e.g. sand blasting and then by firing to convert such non-fired barrier ribs to barrier ribs, thereby to obtain a barrier ribs-formed substrate.

Now, the present invention will be described in further detail with reference to Examples. However, it should be understood that the present invention is by no means restricted to such specific Examples.

EXAMPLES 1 TO 41

Starting materials were mixed so that the composition would be as shown in Table 1, 2, 3, 4, 5 or 6 by mol % in lines for from $SiO_2$ to BaO, from $SiO_2$ to $SnO_2$, or from $SiO_2$ to $CeO_2$. This mixture was heated and melted at from 1,250 to 1,350° C. for 60 minutes by means of a platinum crucible. Then, the molten glass was poured into a stainless steel roller mill and flaked. The obtained flaky glass was dry-pulverized in an aluminum ball mill for 20 hours to obtain a glass powder having an average particle size of from 2 to 4 μm. Further, in line for "B+Zn—Al" in each Table, $((B_2O_3+ZnO)—Al_2O_3)$ is shown.

Examples 1 to 10, 16 to 22, and 28 to 41 represent the first, second and third glasses of the present invention, respectively, and Examples 12 to 15 represent the third glass of the present invention. Examples 11 and 23 to 27 are Comparative Examples. Further, the compositions in Examples 26 and 27 were not vitrified.

The softening point Ts (unit: ° C.) of the obtained glass powder was measured by a differential thermal analysis (DTA) at a temperature raising rate of 10° C./min.

Further, 2 g of the glass powder was press-molded by means of a stainless steel frame having a diameter of 13 mm and fired at 560° C. for 30 minutes, whereby the sinterability was visually evaluated (⊚: excellent, ○: good, X: poor). This evaluation was carried out with respect to a fired product obtained by firing at 560° C., but firing to form barrier ribs may frequently be carried out at a temperature higher than 560° C. In such firing at a high temperature, even one evaluated to be poor, may sometimes be useful. Namely, the evaluation results of being poor in this evaluation may not necessarily deny the applicability to forming of barrier ribs.

Further, the molten glass is cast into a stainless steel mold and subjected to heat treatment to remove a strain and then processed into a columnar shape having a length of 20 mm and a diameter of 5 mm, whereupon the average linear expansion coefficient α (unit: $10^{-7}/°$ C.) within a range of from 50 to 350° C., was measured. The results are shown in each Table.

Further, with respect to some Examples, ∈, the resistivity ρ (unit: Ω·cm) at 100° C., w (unit: $10^{-10}$ A) and the cross-sectional shape of barrier ribs, were measured or observed.

∈: The glass powder was re-melted and formed into a plate shape and then processed into 50 mm×50 mm×3 mm, whereupon on both sides thereof, aluminum was vapor-deposited to form electrodes, whereupon the relative dielectric constant at 20° C. was measured by means of a LCR meter.

log ρ: Using the same sample as used for the measurement of ∈, the resistivity at 100° C. was measured in accordance with ASTM D57. In each Table, its common logarithm is shown. Here, log ρ is preferably at least 5.

w: 12 g of ethylcellulose was dissolved in 88 g of α-terpineol at 80° C. over a period of 2 hours to obtain a vehicle, and 16 of the vehicle, 30 g of the glass powder and 4 g of a silica filler were kneaded by means of a mortar and further by means of a three roll mill to obtain a glass paste. Using this glass paste, w was measured as described above.

Cross-sectional shape of barrier ribs: Using the same glass paste as used for the measurement of w, the cross-sectional shape of barrier ribs was observed, as described in the foregoing. One wherein the upper end portions of trapezoid in the cross-sectional shape are rounded, was evaluated to be ⊚, one wherein the upper hem is substantially linear from one end portion to the other end portion, was evaluated to be ○, one wherein the upper hem is slightly at a sharp angle to the sides at the upper end portions, was evaluated to be Δ, and one wherein the upper hem is distinctly at a sharp angle to both sides, was evaluated to be X.

TABLE 1

| | Examples | | | | | | | |
|---|---|---|---|---|---|---|---|---|
| | 1 | 2 | 3 | 4 | 5 | 6 | 7 | 8 |
| $SiO_2$ | 42.5 | 45 | 45 | 45 | 42.5 | 42.5 | 40 | 45 |
| $B_2O_3$ | 15 | 15 | 15 | 15 | 17.5 | 17.5 | 15 | 15 |
| ZnO | 17.5 | 15 | 15 | 15 | 15 | 20 | 20 | 20 |
| $Li_2O$ | 10 | 10 | 10 | 10 | 10 | 12.5 | 12.5 | 12.5 |
| $Na_2O$ | 5 | 5 | 5 | 5 | 5 | 5 | 2.5 | 5 |
| $Al_2O_3$ | 2.5 | 2.5 | 2.5 | 2.5 | 2.5 | 2.5 | 2.5 | 2.5 |
| MgO | 0 | 0 | 0 | 7.5 | 0 | 0 | 0 | 0 |
| CaO | 0 | 0 | 7.5 | 0 | 0 | 0 | 2.5 | 0 |
| SrO | 0 | 7.5 | 0 | 0 | 0 | 0 | 0 | 0 |
| BaO | 7.5 | 0 | 0 | 0 | 7.5 | 0 | 5 | 0 |
| B + Zn − Al | 30 | 27.5 | 27.5 | 27.5 | 30 | 35 | 32.5 | 32.5 |
| Ts | 600 | 608 | 612 | 609 | 606 | 583 | 596 | 589 |
| α | 90 | 89 | 84 | 81 | 89 | 85 | 84 | 85 |
| Sinter-ability | ○ | ○ | ○ | ○ | ○ | ⊚ | ⊚ | ⊚ |
| Cross section of barrier ribs | Δ | Δ | Δ | Δ | Δ | Δ | Δ | Δ |

TABLE 2

| | Examples | | | | | | |
|---|---|---|---|---|---|---|---|
| | 9 | 10 | 11 | 12 | 13 | 14 | 15 |
| $SiO_2$ | 40 | 32.5 | 22.5 | 45 | 45 | 45 | 30 |
| $B_2O_3$ | 20 | 17.5 | 15 | 15 | 15 | 12.5 | 17.5 |
| ZnO | 20 | 30 | 22.5 | 15 | 15 | 20 | 32.5 |
| $Li_2O$ | 12.5 | 12.5 | 8 | 5 | 15 | 15 | 12.5 |
| $Na_2O$ | 5 | 5 | 2 | 10 | 0 | 2.5 | 5 |
| $Al_2O_3$ | 2.5 | 2.5 | 2.5 | 2.5 | 2.5 | 2.5 | 2.5 |
| MgO | 0 | 0 | 5 | 7.5 | 0 | 0 | 0 |
| CaO | 0 | 0 | 7.5 | 0 | 0 | 0 | 0 |
| SrO | 0 | 0 | 7.5 | 0 | 0 | 0 | 0 |
| BaO | 0 | 0 | 7.5 | 0 | 7.5 | 2.5 | 0 |
| B + Zn − Al | 37.5 | 45 | 35 | 27.5 | 27.5 | 30 | 37.5 |
| Ts | 581 | 560 | 568 | 621 | 589 | 591 | 551 |
| α | 84 | 87 | 103 | 87 | 82 | 85 | 88 |
| Sinter-ability | ⊚ | ⊚ | X | X | X | X | X |
| Cross section of barrier ribs | Δ | Δ | — | — | — | — | — |

TABLE 3

| | Examples | | | | | | |
|---|---|---|---|---|---|---|---|
| | 16 | 17 | 18 | 19 | 20 | 21 | 22 |
| $SiO_2$ | 42.5 | 33 | 32 | 35.5 | 32 | 40 | 32 |
| $B_2O_3$ | 17.5 | 19.5 | 19.5 | 19.5 | 17.5 | 17.5 | 15 |
| ZnO | 20 | 18 | 18 | 18 | 20 | 20 | 17 |
| $Li_2O$ | 10 | 9 | 10 | 9 | 10 | 10 | 5 |
| $Na_2O$ | 7.5 | 7.5 | 7.5 | 7.5 | 7.5 | 7.5 | 3 |
| $Al_2O_3$ | 2 | 10 | 10 | 10 | 12.5 | 4.5 | 5.5 |
| MgO | 0 | 0 | 0 | 0 | 0 | 0 | 0 |
| CaO | 0 | 0 | 0 | 0 | 0 | 0 | 12 |
| SrO | 0 | 0 | 0 | 0 | 0 | 0 | 0 |
| BaO | 0 | 2.5 | 2.5 | 0 | 0 | 0 | 1.5 |
| $Bi_2O_3$ | 0 | 0 | 0 | 0 | 0 | 0 | 8.5 |
| $SnO_2$ | 0.5 | 0.5 | 0.5 | 0.5 | 0.5 | 0.5 | 0 |
| B + Zn − Al | 35.5 | 27.5 | 27.5 | 27.5 | 25 | 33 | 26.5 |
| Ts | 583 | 589 | 581 | 595 | 593 | 580 | 588 |
| α | 85 | 85 | 86 | 81 | 81 | 85 | 92 |
| ∈ | 7.6 | 8.1 | — | — | — | — | 11 |
| log ρ | 12.2 | 12.2 | — | — | — | — | 15.7 |
| w | 2.3 | 3.0 | — | — | — | — | 3.5 |
| Sinter-ability | ⊚ | ⊚ | ⊚ | ○ | ○ | ○ | ⊚ |
| Cross section of barrier ribs | Δ | ⊚ | ⊚ | ○ | ○ | ○ | ⊚ |

TABLE 4

| | Examples | | | | |
|---|---|---|---|---|---|
| | 23 | 24 | 25 | 26 | 27 |
| $SiO_2$ | 43 | 17 | 15 | 30.5 | 32 |
| $B_2O_3$ | 7 | 23.8 | 54 | 19.5 | 19.5 |
| ZnO | 0 | 38.2 | 0 | 18 | 16 |
| $Li_2O$ | 0 | 3.4 | 0 | 10 | 10 |
| $Na_2O$ | 0 | 3.5 | 0 | 7.5 | 7.5 |
| $K_2O$ | 0 | 3.5 | 0 | 0 | 0 |
| $Al_2O_3$ | 7 | 1.4 | 7 | 14 | 14.5 |
| MgO | 0 | 2.2 | 0 | 0 | 0 |
| CaO | 0 | 2.1 | 0 | 0 | 0 |
| SrO | 0 | 2.2 | 0 | 0 | 0 |
| BaO | 0 | 2.2 | 10 | 0 | 0 |
| $Bi_2O_3$ | 0 | 0 | 13.8 | 0 | 0 |
| PbO | 40 | 0 | 0 | 0 | 0 |

TABLE 4-continued

| | Examples | | | | |
|---|---|---|---|---|---|
| | 23 | 24 | 25 | 26 | 27 |
| $TiO_2$ | 3 | 0 | 0 | 0 | 0 |
| $SnO_2$ | 0 | 0.5 | 0 | 0.5 | 0.5 |
| $CeO_2$ | 0 | 0 | 0.2 | 0 | 0 |
| B + Zn − Al | 0 | 60.6 | 47 | 23.5 | 21 |
| Ts | 558 | 560 | 585 | — | — |
| α | 76 | 82 | 72 | — | — |
| ε | 14.1 | 8.5 | 9.8 | — | — |
| log ρ | 14.9 | 15.7 | 9.0 | — | — |
| w | 1.5 | 4.5 | 9.0 | — | — |
| Sinterability | ◎ | ◎ | ◎ | — | — |
| Cross section of barrier ribs | ◎ | ◎ | ◎ | — | — |

TABLE 5

| | Examples | | | | | | |
|---|---|---|---|---|---|---|---|
| | 28 | 29 | 30 | 31 | 32 | 33 | 34 |
| $SiO_2$ | 31 | 31 | 29.5 | 32.5 | 32.5 | 32.5 | 34 |
| $B_2O_3$ | 17.5 | 17.5 | 20.5 | 20.5 | 20.5 | 20.5 | 20.5 |
| ZnO | 21 | 21 | 18 | 18 | 18 | 18 | 18 |
| $Li_2O$ | 9 | 9 | 9 | 9 | 7.5 | 6 | 8.5 |
| $Na_2O$ | 7.5 | 7.5 | 7.5 | 6 | 7.5 | 9 | 5 |
| $Al_2O_3$ | 10 | 10 | 10 | 10 | 10 | 10 | 10 |
| MgO | 0 | 0 | 0 | 0 | 0 | 0 | 0 |
| CaO | 0 | 2.5 | 0 | 0 | 0 | 0 | 0 |
| SrO | 0 | 0 | 0 | 0 | 0 | 0 | 0 |
| BaO | 3.5 | 1 | 5 | 3.5 | 3.5 | 3.5 | 3.5 |
| $SnO_2$ | 0.5 | 0.5 | 0.5 | 0.5 | 0.5 | 0.5 | 0.5 |
| B + Zn − Al | 28.5 | 28.5 | 28.5 | 28.5 | 28.5 | 28.5 | 28.5 |
| Ts | 584 | 589 | 582 | 601 | 607 | 606 | 613 |
| α | 84 | 86 | 89 | 78 | 79 | 85 | 71 |
| ε | 8.0 | 7.9 | — | 7.8 | 7.4 | 8.1 | 7.0 |
| log ρ | — | — | — | 11.6 | 12 | 12.2 | — |
| w | — | — | — | 0.2 | 0.2 | 0.2 | — |
| Sinterability | ◎ | ◎ | ◎ | ◎ | ◎ | ◎ | ◎ |
| Cross section of barrier ribs | ◎ | ◎ | ◎ | ◎ | ◎ | ◎ | ◎ |

TABLE 6

| | Examples | | | | | | |
|---|---|---|---|---|---|---|---|
| | 35 | 36 | 37 | 38 | 39 | 40 | 41 |
| $SiO_2$ | 35.2 | 35.1 | 34 | 34 | 32 | 32.5 | 33.5 |
| $B_2O_3$ | 21.2 | 21.1 | 21.1 | 21.1 | 22.5 | 20.5 | 20.5 |
| ZnO | 18.7 | 18.6 | 18.6 | 18.6 | 18 | 18 | 18 |
| $Li_2O$ | 8.8 | 7.2 | 7.2 | 7.2 | 7 | 7 | 6.5 |
| $Na_2O$ | 5.2 | 7.2 | 7.2 | 7.2 | 7 | 7 | 6.5 |
| $Al_2O_3$ | 10.4 | 10.3 | 10.3 | 10.3 | 13 | 10 | 10 |
| MgO | 0 | 0 | 0 | 0 | 0 | 0 | 0 |
| CaO | 0 | 0 | 0 | 0 | 0 | 0 | 0 |
| SrO | 0 | 0 | 0 | 0 | 0 | 0 | 0 |
| BaO | 0 | 0 | 0 | 0 | 0 | 0 | 0 |
| $TiO_2$ | 0 | 0 | 0 | 1 | 0 | 1 | 1 |
| $ZrO_2$ | 0 | 0 | 1 | 0.6 | 0 | 0 | 0 |
| $SnO_2$ | 0.5 | 0.5 | 0.6 | 0.6 | 0.5 | 0.5 | 0.5 |
| B + Zn − Al | 29.5 | 29.4 | 29.4 | 29.4 | 27.5 | 28.5 | 28.5 |
| Ts | 605 | 602 | 595 | 609 | 613 | 602 | 612 |
| α | 70 | 74 | 72 | 77 | 73 | 74 | 80 |
| ε | 7.3 | 7.4 | 7.5 | 7.5 | 7.3 | 7.9 | 7.7 |
| log ρ | — | — | — | — | — | — | — |

TABLE 6-continued

| | Examples | | | | | | |
|---|---|---|---|---|---|---|---|
| | 35 | 36 | 37 | 38 | 39 | 40 | 41 |
| w | — | — | — | — | — | — | — |
| Sinterability | ◎ | ◎ | ◎ | ◎ | ◎ | ◎ | ◎ |
| Cross section of barrier ribs | ◎ | ◎ | ◎ | ◎ | ◎ | ◎ | ◎ |

Further, as a Comparative Example, starting materials were mixed so that the composition would be, as represented by mol %, 25.5% of $SiO_2$, 22.8% of $B_2O_3$, 13.7% of ZnO, 7.1% of $Li_2O$, 10.3% of $Na_2O$, 10.6% of $Al_2O_3$, 3.9% of MgO, 2.5% of $TiO_2$ and 3.7% of BaO and melted, whereby obtained glass was found to have undergone phase separation.

What is claimed is:

1. Glass for forming barrier ribs, which consists, as represented by mol % based on the following oxides, essentially of from 24 to 50% of $SiO_2$, from 13 to 23% of $B_2O_3$, from 10 to 32% of ZnO, from 3 to 20% of $Li_2O$, from 1 to 9% of $Na_2O$, from 1 to 15% of $Al_2O_3$, from 0 to 20% of MgO+CaO+SrO+BaO, and from 0 to 9% of $Bi_2O_3$, wherein (($B_2O_3$+ZnO)—$Al_2O_3$) is at least 24 mol %; in a case where $ZrO_2$ is contained, its content is at most 2 mol %; and neither PbO nor F is contained.

2. The glass for forming barrier ribs according to claim 1, wherein ($B_2O_3$+ZnO) is at most 50 mol %.

3. The glass for forming barrier ribs according to claim 1, wherein ($Na_2O$—$Li_2O$) is at most 4 mol %.

4. The glass for forming barrier ribs according to claim 1, wherein MgO is from 0 to 8 mol %; CaO is from 0 to 8 mol %; SrO is from 0 to 8 mol %; and BaO is from 0 to 8 mol %.

5. The glass for forming barrier ribs according to claim 1, wherein ($Li_2O$+$Na_2O$+$Bi_2O_3$) is at least 11 mol %.

6. The glass for forming barrier ribs according to claim 1, which contains no $Bi_2O_3$.

7. The glass for forming barrier ribs according to claim 1, which has a softening point of at most 615° C.

8. The glass for forming barrier ribs according to claim 1, which has an average linear expansion coefficient of from $65 \times 10^{-7}$ to $95 \times 10^{-7}$/° C. within a range of from 50 to 350° C.

9. A plasma display panel having barrier ribs formed by using the glass as defined in claim 1.

10. Glass for forming barrier ribs, which consists, as represented by mol % based on the following oxides, essentially of from 24 to 50% of $SiO_2$, from 13 to 32% of $B_2O_3$, from 15 to 32% of ZnO, from 3 to 20% of $Li_2O$, from 1 to 15% of $Na_2O$, from 1 to 15% of $Al_2O_3$, from 0 to 20% of MgO+CaO+SrO+BaO, and from 0 to 9% of $Bi_2O_3$, wherein (($B_2O_3$+ZnO)—$Al_2O_3$) is at least 24 mol %; ($Na_2O$—$Li_2O$) is at most 4 mol %; in a case where $ZrO_2$ is contained, its content is at most 2 mol %; and neither PbO nor F is contained.

11. The glass for forming barrier ribs according to claim 10, wherein ($B_2O_3$+ZnO) is at most 50 mol %.

12. The glass for forming barrier ribs according to claim 10, wherein MgO is from 0 to 8 mol %; CaO is from 0 to 8 mol %; SrO is from 0 to 8 mol %; and BaO is from 0 to 8 mol %.

13. The glass for forming barrier ribs according to claim 10, wherein ($Li_2O$+$Na_2O$+$Bi_2O_3$) is at least 11 mol %.

14. The glass for forming barrier ribs according to claim 10, which contains no $Bi_2O_3$.

15. The glass for forming barrier ribs according to claim 10, which has a softening point of at most 615° C.

16. The glass for forming barrier ribs according to claim 10, which has an average linear expansion coefficient of from $65\times10^{-7}$ to $95\times10^{-7}$/° C. within a range of from 50 to 350° C.

17. A plasma display panel having barrier ribs formed by using the glass as defined in claim 10.

18. The glass for forming barrier ribs according to claim 1, wherein $B_2O_3$ is from 13 to 19.5%.

19. The glass for forming barrier ribs according to claim 10, wherein $B_2O_3$ is from 13 to 19.5%.

* * * * *